US011095630B1

(12) United States Patent
Wilkinson et al.

(10) Patent No.: US 11,095,630 B1
(45) Date of Patent: *Aug. 17, 2021

(54) AUTHENTICATING MOBILE TRAFFIC

(71) Applicant: UNITED SERVICES AUTOMOBILE ASSOCIATION (USAA), San Antonio, TX (US)

(72) Inventors: Christopher Thomas Wilkinson, San Antonio, TX (US); Gabriel Carlos Fernandez, San Antonio, TX (US); Vicente Garcia, Helotes, TX (US); Gregory James McChesney, San Antonio, TX (US); Matthew Thomas Murray, San Antonio, TX (US); Rickey Dale Burks, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,251

(22) Filed: Jan. 29, 2018

Related U.S. Application Data

(63) Continuation of application No. 14/156,054, filed on Jan. 15, 2014, now Pat. No. 9,882,884.

(51) Int. Cl.
*H04L 29/06* (2006.01)
(52) U.S. Cl.
CPC ............ *H04L 63/08* (2013.01); *H04L 63/061* (2013.01)

(58) Field of Classification Search
CPC .............................. H04L 63/08; H04L 63/061
See application file for complete search history.

(56) References Cited

U.S. PATENT DOCUMENTS

| | | | | |
|---|---|---|---|---|
| 7,035,257 B2* | 4/2006 | Vafaei | ..................... | H04L 29/06 370/389 |
| 7,111,322 B2* | 9/2006 | Slick | ..................... | G06F 21/608 726/19 |
| 7,360,096 B2* | 4/2008 | Bracewell | ............. | H04L 63/068 713/183 |
| 7,627,752 B2* | 12/2009 | Sakaguchi | .......... | H04L 63/0428 709/236 |
| 8,024,471 B2* | 9/2011 | Sinclair | ................. | G06F 16/958 709/229 |
| 8,046,271 B2* | 10/2011 | Jimenez | ............. | G06Q 10/0637 705/26.62 |

(Continued)

*Primary Examiner* — Kevin Bechtel
*Assistant Examiner* — Thanh H Le
(74) *Attorney, Agent, or Firm* — Fish & Richardson P.C.

(57) ABSTRACT

Methods, systems, and apparatus, including computer programs encoded on computer storage media, to authenticate mobile traffic. One of the methods includes receiving a first request for a strategy from a client device over a network. The method includes providing a current strategy to the client device, the current strategy including characteristics used to authenticate requests from the client device based on the inclusion of the characteristics in the request. The method includes receiving, from the client device, a second request for access to a processing system. The method includes validating the second request according to one or more strategies, including the current strategy. The method also includes forwarding the second request to the processing system based on the validation.

20 Claims, 7 Drawing Sheets

(56) References Cited

U.S. PATENT DOCUMENTS

| | | | | |
|---|---|---|---|---|
| 8,108,670 B2* | 1/2012 | Morgan | ............... | H04L 63/062 |
| | | | | 713/158 |
| 8,131,799 B2* | 3/2012 | Landsman | .......... | H04L 63/0407 |
| | | | | 709/203 |
| 8,560,705 B2* | 10/2013 | Larson | ............. | H04L 29/12066 |
| | | | | 709/227 |
| 8,667,569 B2* | 3/2014 | Tesch | ...................... | G06F 21/45 |
| | | | | 707/698 |
| 8,713,694 B2* | 4/2014 | Harada | ............... | G06Q 20/206 |
| | | | | 705/319 |
| 2008/0152149 A1* | 6/2008 | Bauchot | ............... | H04L 63/064 |
| | | | | 380/279 |
| 2009/0037995 A1* | 2/2009 | Zapata | ................... | G06F 21/43 |
| | | | | 726/9 |
| 2009/0150525 A1* | 6/2009 | Edgett | .................... | H04L 63/08 |
| | | | | 709/220 |
| 2009/0323971 A1* | 12/2009 | Munguia | .............. | H04L 63/061 |
| | | | | 380/284 |
| 2014/0344232 A1* | 11/2014 | Kludy | .................. | G06F 40/174 |
| | | | | 707/694 |

* cited by examiner

AUTHENTICATING MOBILE TRAFFIC

CROSS-REFERENCE TO RELATED APPLICATION

This application is a continuation application of and claims priority to U.S. application Ser. No. 14/156,054, filed on Jan. 15, 2014, which is incorporated by reference into the present disclosure.

BACKGROUND

Malicious individuals may seek to disrupt the ability of a business to communicate with customers. One of the ways malicious individuals attack businesses is through a distributed denial of service (DDOS) attack. A DDOS attack occurs when a large number of compromised systems attempt to flood the communications network of a business, thereby preventing legitimate users from accessing the network.

Many users interact with businesses and other institutions using client devices. Custom applications have been created specifically for use on client devices. In general, client devices communicate with businesses using a channel that is separate from traditional internet traffic.

SUMMARY

In general, one innovative aspect of the subject matter described in this specification can be embodied in methods that include the actions of receiving a first request for a strategy from a client device over a network. The methods include the actions of providing a current strategy to the client device, the current strategy including characteristics used to authenticate requests from the client device based on the inclusion of the characteristics in the request. The methods include the actions of receiving, from the mobile device, a second request for access to a processing system. The methods include the actions of validating the second request according to one or more strategies, including the current strategy. The methods include the actions of forwarding the second request to the processing system based on the validation.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The strategy may identify a key and a value. Validating the second request may include determining that the value is present in a field of the second request, the field identified by the key. The methods may include the actions of validating that a time identified by a time stamp included in the second request is within a threshold value of the current time. The second request may include the value encrypted using an encryption key stored securely on the client device. The strategy may include a command. The command may instruct the client device to include a header that includes the value in a field identified by the key in subsequent communications. The command may instruct the client device to include a cookie that includes the value in a field identified by the key in subsequent communications. Prior to receiving the first request, the methods may include the actions of receiving a third request for access to the processing system, the third request omitting the characteristics. In response to receiving the third request, the methods may include the actions of sending a rejection to the client device; the rejection instructing the client device to update the strategy. The methods may include the actions of receiving a server strategy file, the server strategy file may include a new prior strategy, a new current strategy, and a new future strategy, the new prior strategy may include first characteristics, the new current strategy may include second characteristics, and the new future strategy may include third characteristics. The methods may include the actions of generating a file including the current strategy. The first characteristics, the second characteristics, and the third characteristics may be different. The first characteristics of the new prior strategy may be the characteristics identified by the current strategy file. The one or more strategies may include a prior strategy, the prior strategy associated with an expiration time. Validating the second request according to one or more strategies may include determining the expiration time is after a current time and comparing the prior strategy to the request including determining whether characteristics identified by the prior strategy are present in the request. The methods may include the actions of providing an encryption key to the client device, the encryption key encrypted using a second encryption key stored securely on the client device. The encryption key may be stored in a secure storage area of the client device. The encryption key may also be stored on a machine performing the method.

The subject matter described in this specification can be implemented in various particular embodiments so as to realize one or more of the following advantages. Network traffic from a client device may be authenticated. Distributed denial of service (DDoS) attacks can be prevented while allowing legitimate users to communicate with the business. Systems can verify that client devices are using a legitimate, unmodified version of a connectivity application. Systems can proactively and dynamically respond to DDoS attacks. Strategies may be modified at runtime without recompiling application code. Behavioral characteristics of an application on a client device may be modified dynamically by the strategy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, users can communicate with businesses using client devices. Custom applications can facilitate this communication by providing an easy to use interface. These mobile applications can communicate with the business using a dedicated communication channel. A businesses network can be attacked using this channel. For example, a denial-of-service attack floods the communication channel with messages in an attempt to overload the system which can then cause a temporary or indefinite interruption in the ability of the business to communicate with its customers. In another example, a replay attack occurs when otherwise valid data is intercepted and repeated or delayed. A replay attack can be used to fraudulently pose as another individual.

A gatekeeper process can determine whether or not communications over a communication channel are authentic. For example, as discussed further below, the gatekeeper may specify a communication strategy for all communications between the client device and the business. Traffic which conforms to this strategy is accepted while traffic that does not conform is rejected. The gatekeeper process can periodically update the required characteristics of the channel by updating the strategy. In some implementations, the gatekeeper can update the strategy across an entire network of client devices in less than fifteen minutes. Therefore, the gatekeeper can rapidly respond to potential attacks on the communications infrastructure. In general, a strategy is data that instructs a client device on how to formulate requests that will be accepted by the gatekeeper. A strategy can be a file that contains one or more instructions that dictate the behavior of an application. Each instruction can include a function symbol, key, and value that is used to validate requests at the edge of a network prior to being sent to the hosting data center. If the expected values are not transmitted by the application to the edge, the session can be denied.

While the systems, methods, and mediums for authenticating mobile traffic are described below with respect to a client device and a gatekeeper, the systems, methods, and mediums described herein can be used to protect and secure business-to-business or server-to-server communications across a public network. (e.g. Internet).

Figure 1:
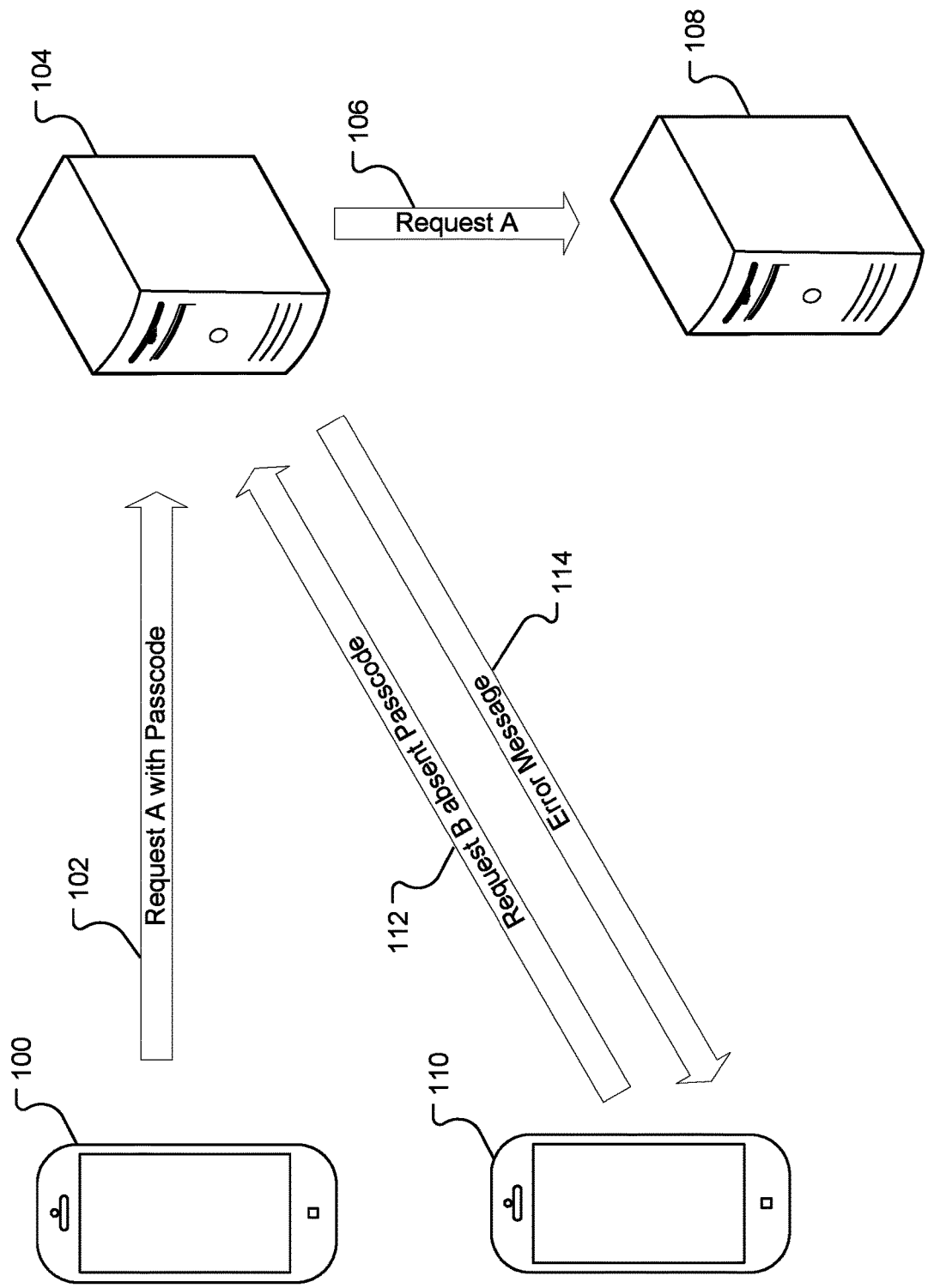
FIG. 1 illustrates an example of a communication strategy between client devices and a gatekeeper.

FIG. 1 illustrates an example of a communication strategy between client devices 100, 110 and a gatekeeper 104. The gatekeeper 104 receives communications from client devices 100, 110. The gatekeeper can be, for example, a web FIG. 1 illustrates an example of a communication strategy between client devices 100, 110 and a gatekeeper 104. The gatekeeper 104 receives communications from client devices 100, 110. The gatekeeper can be, for example, a web server, or another computer process being executed on an electronic computing device that is capable of receiving and responding to requests over a network. For example, the gatekeeper 104 can receive hypertext transport protocol (HTTP) requests from client devices. An example of a client device is an electronic device that is under the control of a user and capable of requesting and receiving resources over the network. A client device (an example of which includes the device 100 of FIG. 1) may include one or more processing devices, and may be, or include, a mobile telephone (e.g., a smartphone), a laptop computer, a handheld computer, a tablet computer, an enhanced general packet radio service (EGPRS) mobile phone, a media player, a navigation device, an email device, a game console, an interactive or so-called "smart" television, or a combination of any two or more of these data processing devices or other data processing devices. In general, the client device communicates with the network using a wireless connection.

In some implementations, the client device may execute a mobile application, such as a software application that is designed to run on smartphones, tablets, or other similar devices. The mobile application may be a custom mobile application designed to enable the client device to communicate with a computer system 108 by way of the gatekeeper 104.

In this example, the client device 100 sends a request accompanied by a strategy 102. As discussed above, the strategy indicates to the gatekeeper that the request is legitimate. The strategy can be stored in any part of the request. For example, the strategy may be included in a field in an HTTP header or may be included in a cookie.

In some implementations, the strategy can be hidden within the request or within a file using steganography. In general, steganography refers to encoding hidden messages within a data stream in such a way that it is not apparent that the message is present. For example, the strategy may be hidden within the packets of TCP/IP communication.

In some implementations, the strategy may be encrypted using an encryption key stored in a secured location on the client device, such as the SECURE KEYCHAIN of the iOS operating system. For example, the strategy may require that a predetermined value be stored in a predetermined field in an HTTP header. The client device 100 may encrypt the predetermined value using an encryption key provided by the gatekeeper 104.

In some implementations, a current timestamp can be associated with the predetermined value prior to encryption. For example, the timestamp may be included with the predetermined value, may be appended to the end of the predetermined value, may be prepended before the predetermined value, or may be otherwise included in the predetermined value prior to encryption. The timestamp may be delimited from the predetermined value using a predetermined delimiter, such as a comma, period, semi-colon, space, carriage return, or any other value. In this manner, the same predetermined value encrypted using the same key at two different times would produce two different encrypted values.

The encrypted key may be transformed into a textual representation using a binary to text encoding scheme, such as a Base64 encoding algorithm. In general, Base64 encoding is an encoding scheme that enables binary data to be included in an ASCII text string. The encoded encrypted predetermined value can be stored in the predetermined field of the HTTP header.

The gatekeeper 104 checks the request for the strategy. For example, the gatekeeper may check the HTTP header to determine if the predetermined field is present. If the predetermined field is present, the gatekeeper can decode the value stored in the predetermined field. The field may be decoded using a conventional text to binary algorithm such as Base64.

The decoded value can then be decrypted using a key stored on the gatekeeper.

In some implementations, the encryption algorithm used by the client device and the gatekeeper can be a symmetric key encryption algorithm. In general, a symmetric key algorithm is an encryption algorithm that uses the same cryptographic key for both encryption and decryption. The keys may be identical or there may be a simple transformation to go between the two keys. Examples of symmetric key encryption algorithms include the Advanced Encryption Standard (AES), Twofish, Serpent, 3DES, IDEA etc.

The decrypted decoded value can be compared to the predetermined value. In implementations in which a time stamp is appended or prepended to the predetermined value, the gatekeeper may discard the time stamp or may verify the time stamp is within a threshold of the current time. For example, the gatekeeper 104 may determine that the timestamp is for a time within one second, ten seconds, thirty seconds, one minute, five minutes, ten minutes, fifteen minutes, or thirty minutes of the current time. In some implementations, the gatekeeper 104 may provide the current time as recorded on the server to the client device when the strategy is provided. The client device may identify an offset which can be used to synchronize the time of the mobile device with the server time.

If the decrypted decoded value matches the predetermined value, the gatekeeper 104 passes the request 106 to the computer system 108. The computer system 108 processes the request and performs the requested action.

As an example of a request that does not include the strategy, client device 110 sends a request absent the strategy 112. The gatekeeper detects that the strategy is not present and returns an error message 114 to the client device 110.

The error message can be selected from a list of available status codes for the communication protocol. For example, the gatekeeper may send a custom HTTP response status code (such as HTTP 376) or may use a standard HTTP response (such as HTTP 403 Forbidden usually delivered when a server understands the request but refuses to fulfill it or HTTP 503 Service Unavailable, usually delivered when a server is currently unable to handle the request).

In some implementations, the error message may be used by the client device to determine a next action, as discussed further below. For example, receiving one status code may indicate that the client device should update the strategy. Receiving a different status code may indicate that the client device should update the encryption key.

Initially, an encryption key can be added into the secure storage of the client device by an application executing on the client device. The initial encryption key can be labeled with the version 1. If Gatekeeper 104 is using version 3 encryption key, Gatekeeper 104 can respond with instruction that instructs the client device to update their encryption key to version 3. Version 3 encryption key can also sent as part of this instruction. Version 3 encryption key is then stored in the secure storage area of the client device for future use.

Figure 2:
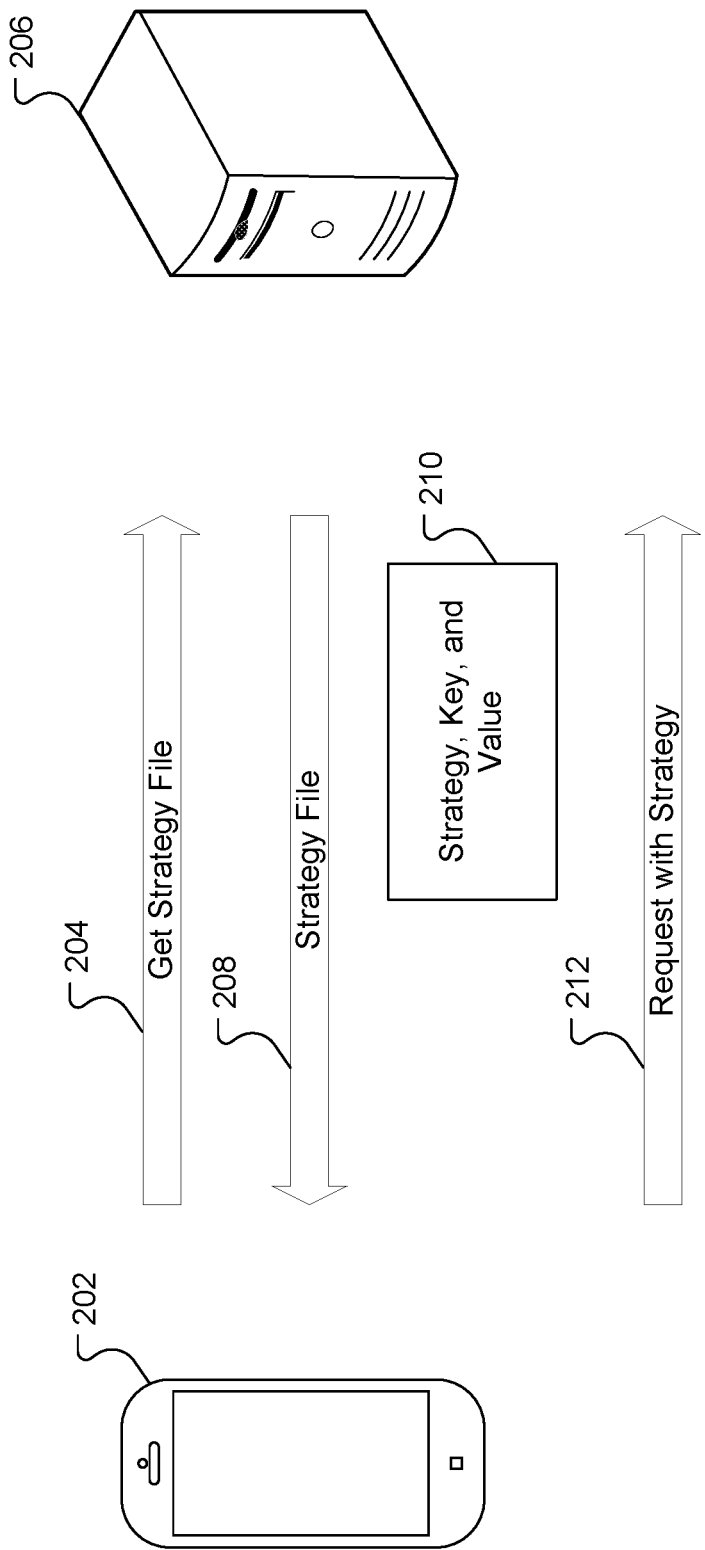
FIG. 2 illustrates an example of a client device obtaining the strategy from a gatekeeper.

FIG. 2 illustrates an example of a client device 202 obtaining the strategy from a gatekeeper 206. The client device 202 may obtain the strategy in response to a communication from the gateway 206. For example, as described above, the gatekeeper 206 may respond to an HTTP request with a standard HTTP status code of 503 or a custom status code, indicating the server is busy. However, an application on the client device 206 may interpret the status code as a requirement that the client device 206 update its communication strategy by obtaining a new strategy. Thus, upon receiving a particular status code, such as code 503, the client device sends a request to the gatekeeper 206 to request the current strategy.

The client device 202 may decide to obtain the strategy in response to conditions on the client device. For example, the client device may obtain the strategy from the gatekeeper when a mobile application used to communicate with the gatekeeper 206 is launched or when the mobile application is resumed from a suspended state. On a mobile device, a suspended state is where an application is present in the background of the device (that is, resident in memory buy not currently being displayed on the user interface) and does not have any code being executed.

Once the client device 202 determines to update the strategy, the client device 202 sends a request for the strategy file to the gatekeeper 206.

The gatekeeper sends a strategy file to the client device 208. The strategy file can include, for example, a command, a key, and a value. The command instructs the client device about an action to take consistent with the strategy. For example, the command may instruct the client device to include the predetermined key and predetermined value in an http header or in a cookie. The command may instruct the client device to update its encryption key, as discussed below. The key and value can provide the value to be included with each request in order for the request to be authenticated. The key can identify where the value should be stored. For example, the key can identify the name of a field. The value identifies what should be placed in the field.

In some implementations, the gatekeeper 206 may maintain multiple different strategies. For example, the gatekeeper 206 may include a current strategy (which is sent to the client device 202), a prior strategy, and a future strategy.

The client device can then send a request with the key and value 210 to the gatekeeper 206.

In some implementations, the contents of the strategy file (e.g. the command, the key, and the value) can be encrypted using symmetric key encryption as described above. The encrypted command, key and value may be encoded using a Base64 encoding. The client device 202 decodes and decrypts the contents of the strategy file.

The client device 202 uses the updated strategy for subsequent communications 212 with the gateway 206.

Figure 3:
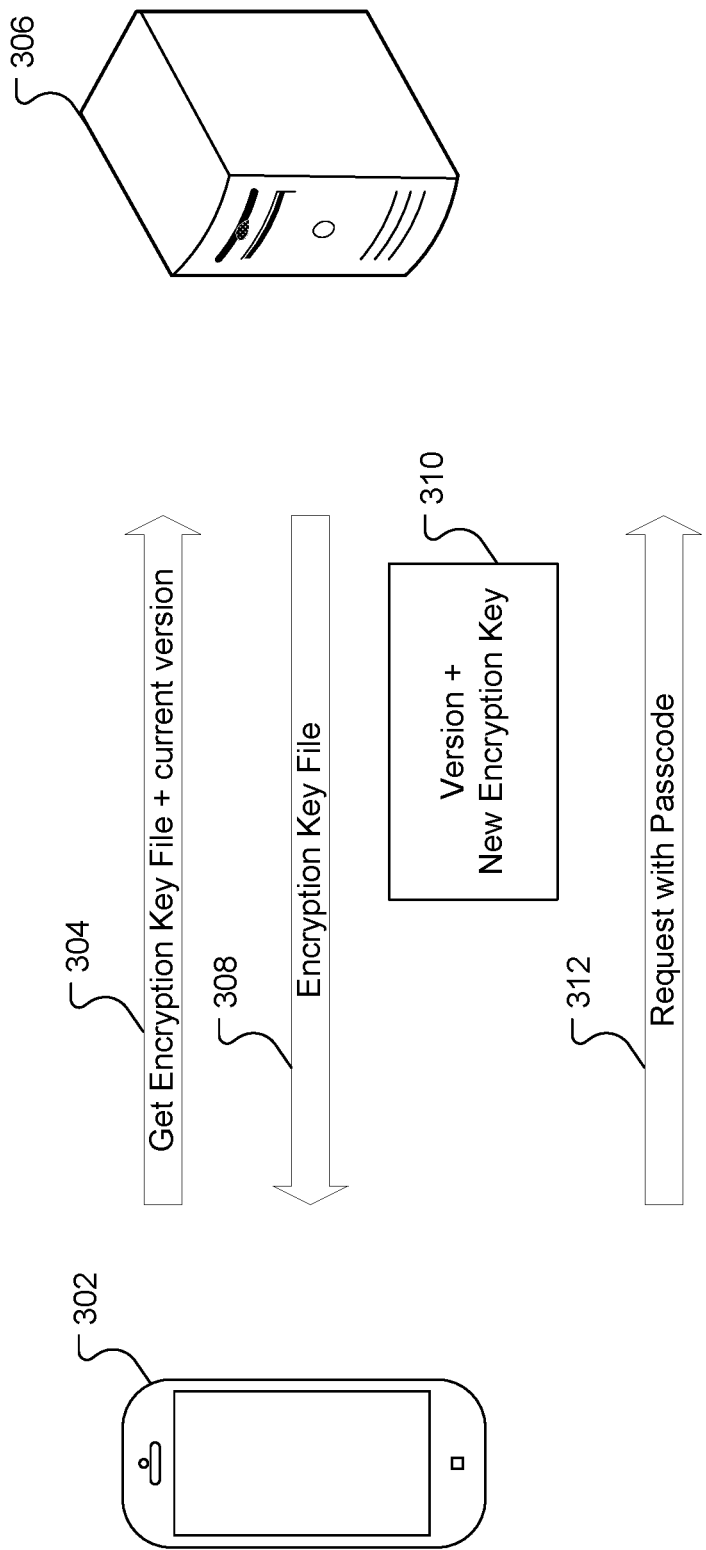
FIG. 3 illustrates an example of a client device receiving an updated encryption key from a gatekeeper.

FIG. 3 illustrates an example of a client device receiving an updated encryption key from a gatekeeper 306. The client device may obtain a new encryption key based on an instruction sent by the gatekeeper 306 as part of a strategy file. The client device may also determine to obtain a new encryption key based on receiving an unintelligible message from the server.

A client device 302 sends a request 304 for a new encryption key to the gatekeeper 306. In some implementations, the request can include a version number that corresponds to the current key on the system.

The gatekeeper provides a key file 310 to the user 308. The key file can include the new key. The new key can be encrypted using the encryption key that corresponds to the version number provided in the request 304.

Upon receiving the key file 310, the client device can decrypt the encrypted key using the current key of the device. The client device then stores the new key in a secure location. For example, many smart phones include a secure storage locker in which an application may store sensitive data. The storage locker itself may be encrypted by the smartphone using an encryption key unique to the device. The encryption key of the device may be protected using a password or passcode that is entered by the user of the smartphone when turning the device on or unlocking the device.

The client device 302 can use the new encryption key to send a new request 312.

Figure 4:
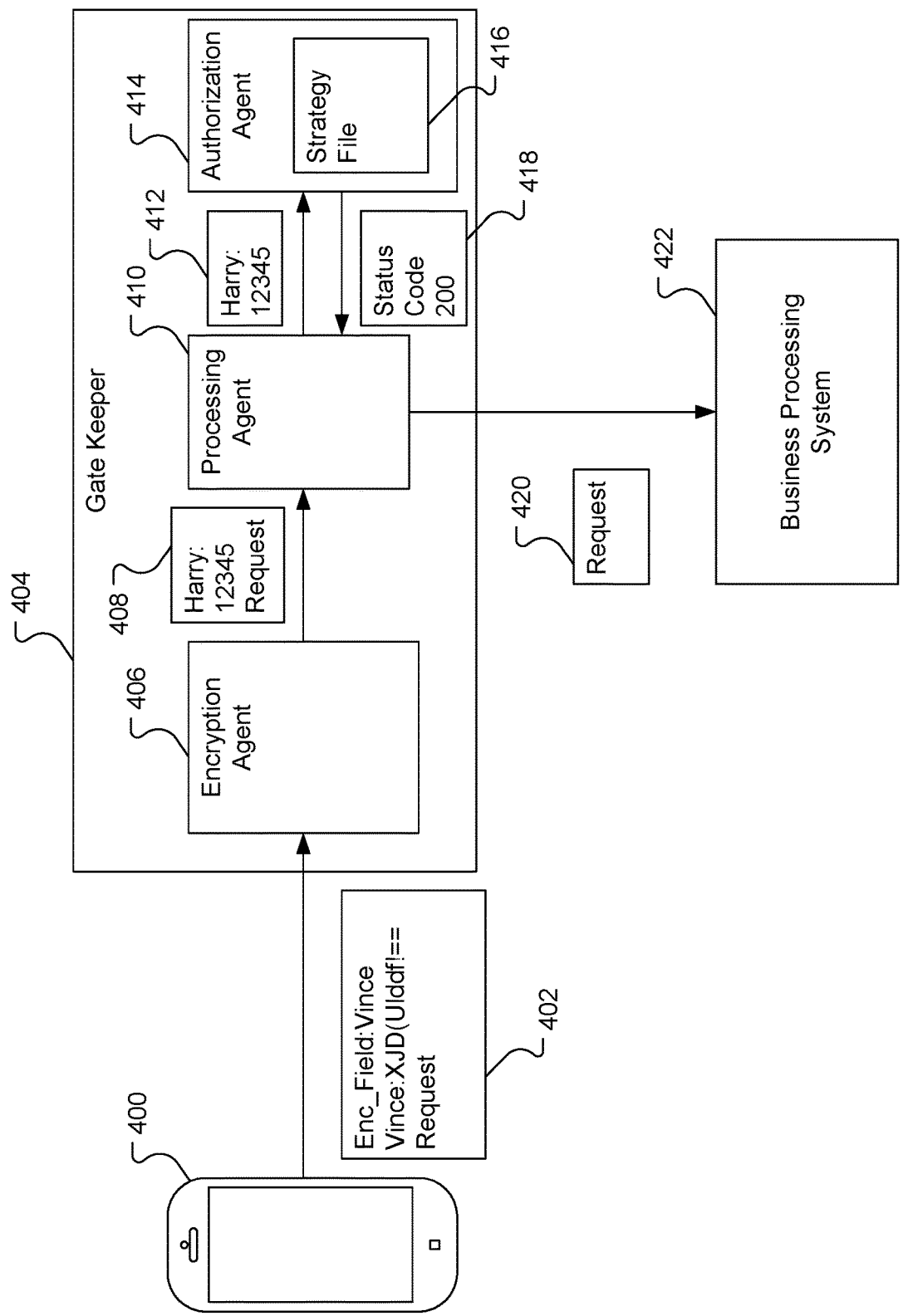
FIG. 4 illustrates an example implementation of a gatekeeper.

FIG. 4 illustrates an example of a gatekeeper 404. The gatekeeper 404 includes an encryption agent 406, a processing agent 410, and an authorization agent 414. The encryption agent 406, processing agent 410, and authorization agent 414 may be, for example, a process or multiple processes executing on a computer system having one or more processors. The processes may be executed on the same computer or may be distributed among several different computers.

When the gatekeeper 404 receives a request 402 from a client device 400, the encryption agent 406 identifies encrypted fields and decrypts them. In one implementation, the client device 400 identifies the encrypted fields in the request 402. In this example, the request 402 includes a header field "Enc_Field" which identifies the field "Vince" as included encrypted data. In other implementations, the Gatekeeper identifies the encrypted fields based on a previous, current, or future strategy. For example, if the current strategy requires the header to include a field "Vince", the previous strategy requires the request to be accompanied by a cookie, and the next strategy has been determined to require the header include a field "Harry" then the encryption agent can examine the request for a cookie, the header field "Vince" and the header field "Harry."

The encryption agent 406 decrypts the value in the field and forwards the unencrypted request to the processing agent 410. The processing agent 410 identifies the field and value 412 associated with the strategy and sends them to an authorization agent 414.

The authorization agent 414 compares the field and value 412 to the strategy file 416, which identifies the current strategy that includes the field and value that are to be provided with each valid request. If the field and value 412 matches a valid strategy identified in the strategy file 416, the authorization agent sends a response code indicating the request is valid. For example, the authorization agent may send an HTTP 200 status code, the HTTP 200 status code is normally sent when an HTTP request is successfully received and responded to. If the field and value 414 did not match a valid strategy, the authorization agent 414 may send an error code, such as an HTTP status code 403.

The strategy file 416 may be different from the file including the strategy sent to the client device, for example, strategy file 208 of FIG. 2. For example, the strategy file 416 may include multiple different valid strategies, where each client device may be provided with a single strategy. For example, the strategy file may include a previous strategy, which may be in effect for a period of time after it has been replaced, a current strategy, and a future strategy. Using three strategies can be used to account for latency in data replication, as discussed below.

When the processing agent 410, receives an affirmative status code, the processing agent 410 forwards the request 420 to the business processing system 422. The business processing system manages the response to the request.

Figure 5:
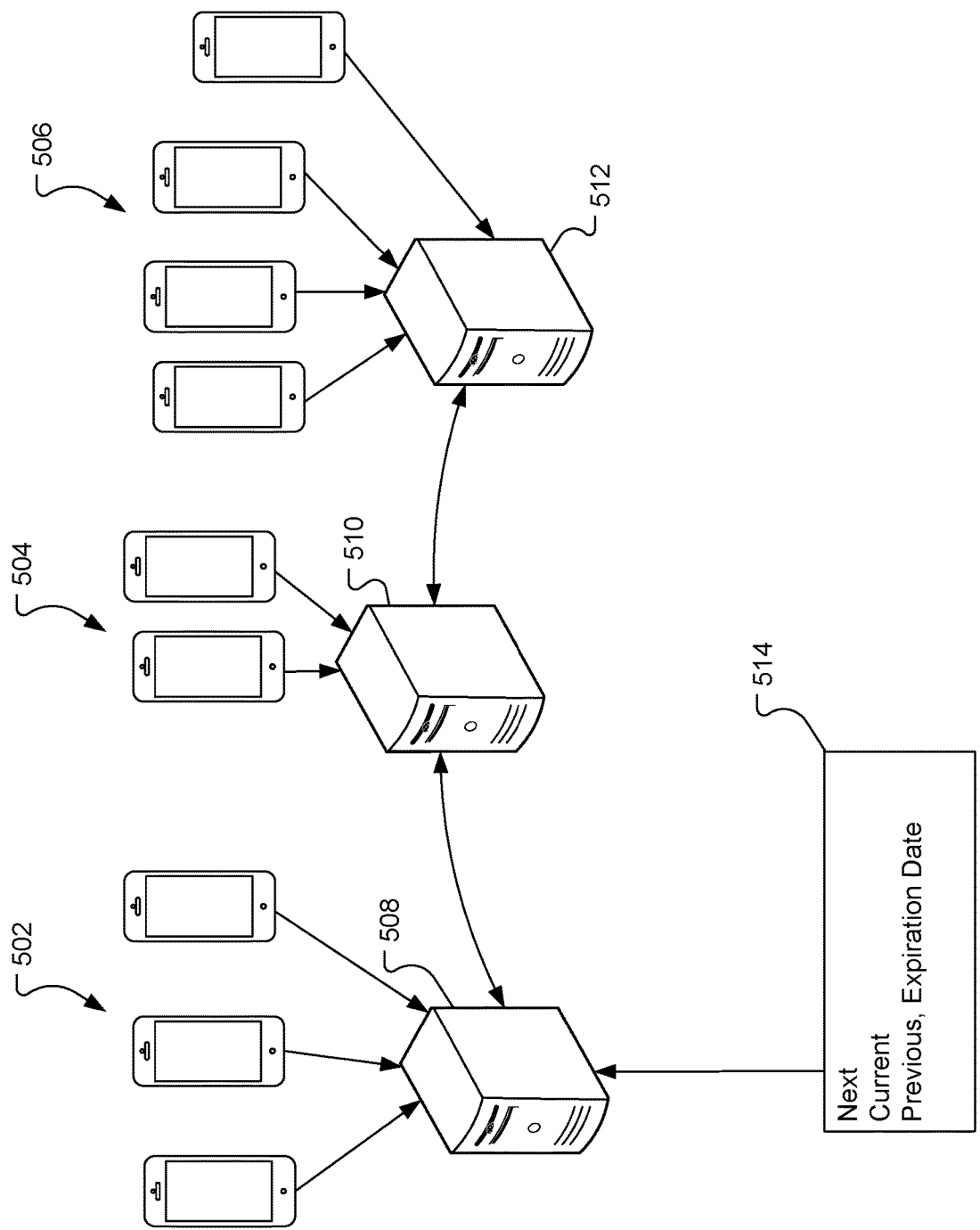
FIG. 5 illustrates an example of a process for distributing a strategy among multiple computer systems.

FIG. 5 illustrates an example of a process for distributing a strategy among multiple computer systems. In some environments, many different gatekeeper servers may provide access to many different client devices. For example, mobile devices 502 may be provided access by gatekeeper 508, mobile devices 504 may be provided access by gatekeeper 510 and mobile devices 506 may be provided access by gatekeeper 512. In some environments there may be hundreds or thousands of gatekeepers that provide access to mobile devices. In some implementations, the gatekeeper that provides access to a mobile device for one request may not be the same gatekeeper that provides access for a subsequent request.

The strategy may be changed because a computer system detected a possible denial of service attack or may be changed based on a predetermined schedule, which may be regular or randomized.

When a new strategy is introduced into the system it needs to be propagated from gatekeeper to gatekeeper. For simplicity, the strategy file 514 may be propagated from the gamekeeper 508 to the gatekeeper 510 and from the gatekeeper 510 to the gatekeeper 512. In some configuration, the system may take several minutes or more to fully distribute a new strategy to all the gatekeepers.

In order to minimize the possibility that legitimate requests from mobile devices are rejected, the strategy file (e.g. the strategy file 416 used by the gatekeeper to validate requests, as described in FIG. 4) may include multiple strategies. In one implementation, the strategy file may include the expiring strategy along with an expiration date and time. The strategy file may also include a current strategy that is replacing the expiring strategy. The strategy file may also include a next strategy that is to be the strategy to eventually replace the current strategy.

A strategy generator agent may generate a current strategy file from the multiple strategies. The current strategy file can be used to provide a single strategy to a client device to use when sending requests. The strategy generator agent may be for example, a process or multiple processes executing on a computer system having one or more processors. The processes may be executed on the same computer or may be distributed among several different computers.

A gatekeeper will accept traffic from an expiring strategy until the expiration date and time, the current strategy, and the next strategy. In this manner, even if a mobile device has received a new strategy before a gatekeeper is updated, the gatekeeper will still allow the communication from the mobile device.

Figure 6:
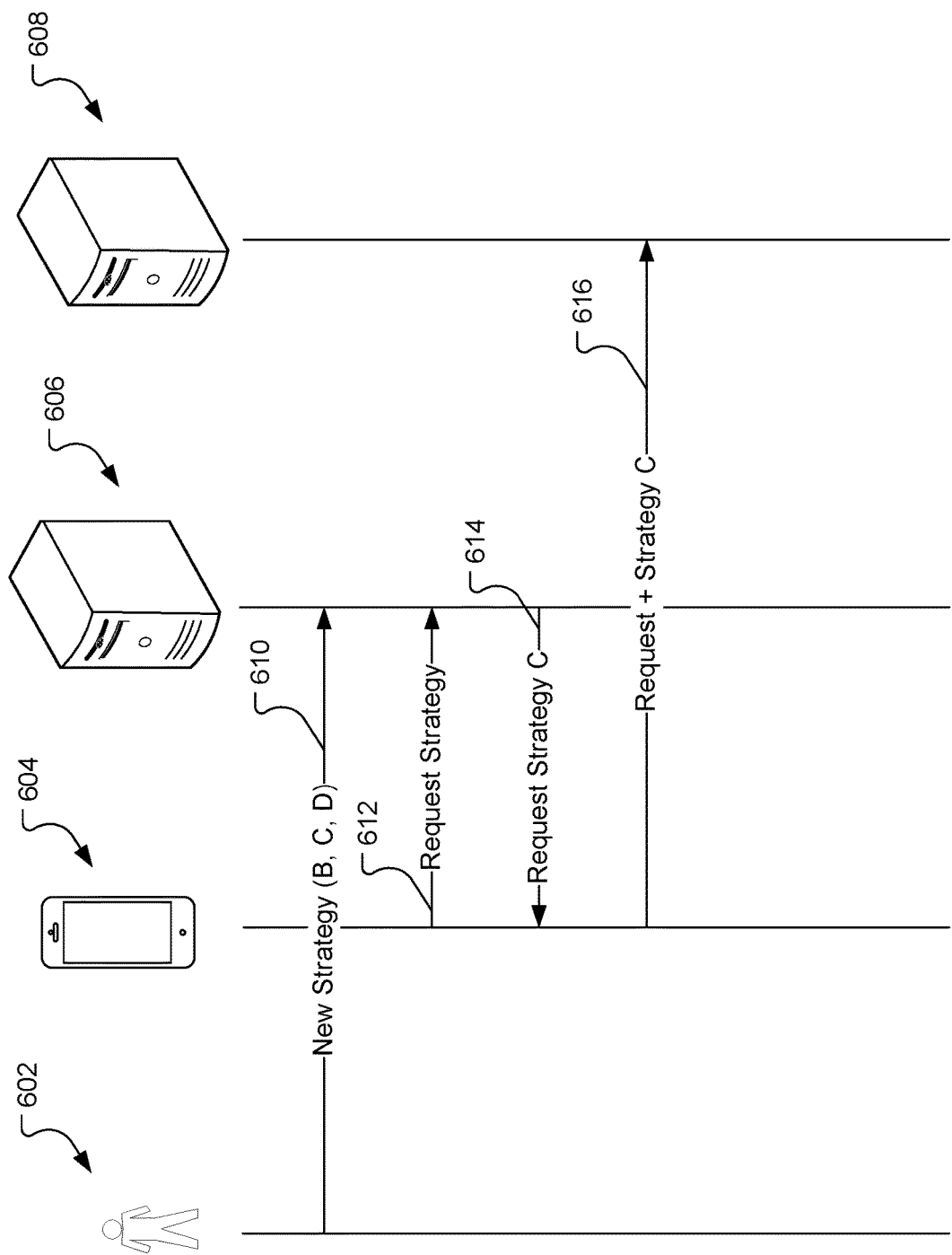
FIG. 6 illustrates an example of a client device sending a request associated with a future strategy to a gatekeeper.

An example of a mobile device receiving an updated strategy before a gatekeeper is shown in FIG. 6. Initially, a gatekeeper 606 has a strategy file that lists strategies A, B, and C and accepts strategy B, and C (strategy A having expired at some time in the past). A gatekeeper 608 has a strategy file that lists strategies A, B, and C and accepts strategy B, and C.

An administrator supplies a new strategy file to gatekeeper 606. The administrator may determine to provide a new strategy in response to a predetermined schedule, because a likelihood of a denial of service attack, randomly, or for any reason. The new strategy file may identify strategies B, C, and D, with strategy B scheduled to expire at a predetermined time. The gatekeeper is to propagate the new strategy file to the gatekeeper 608.

Before the strategy reaches the gatekeeper 608, a client device requests a strategy file from the gatekeeper 606. The gatekeeper 606 provides strategy C to the client device, as described above.

Next, the client device sends a request to gatekeeper 608 using strategy C. Because strategy C is a valid strategy in the current strategy file, gatekeeper 608 allows the request.

Figure 7:
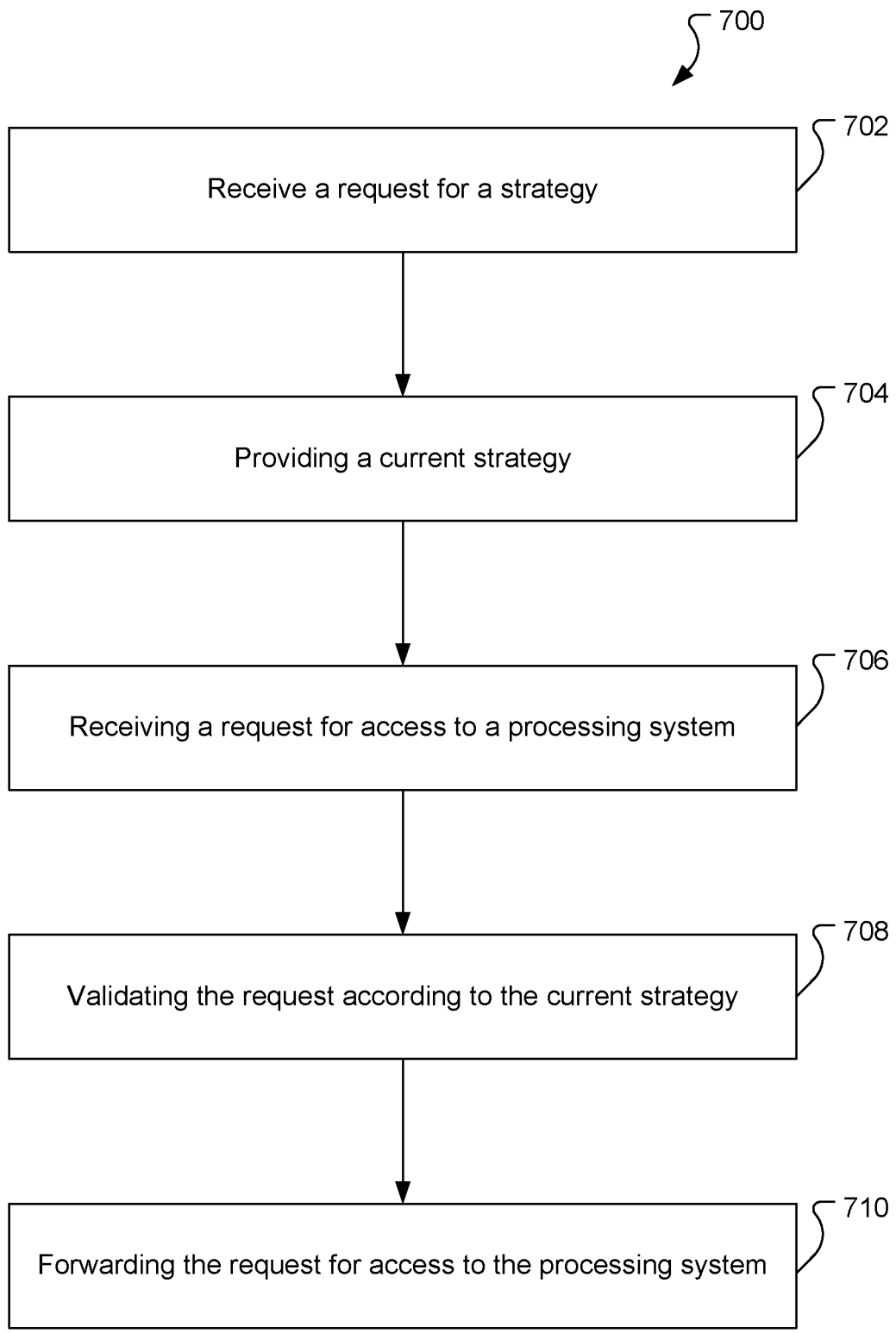
FIG. 7 is a flow chart of an example of a process for validating incoming network requests.

FIG. 7 is a flow chart 700 of an example of a process for validating incoming network requests. The process may be performed by a computer executing the process. For example, the process may be performed by the gatekeeper 104 of FIG. 1. For clarity, the process will be described in relation of a system performing the process.

A request for a strategy is received (702). As discussed above, a client device may request a strategy in response to a message from the gatekeeper or upon starting or resuming a process that communicates with the gatekeeper.

A current strategy is provided (704). In some implementations, a gatekeeper may have one or more strategies stored in a strategy file. The strategy file may be a flat file, entries in a relational database, or any other mechanism that can be used for storing data, for example, a past strategy with an expiration date, a current strategy, and a future strategy. The gatekeeper may generate a client strategy file for the client device (for example, a JSON file) based on the current strategy. The client strategy file may be generated in response to a change in the current strategy, or may be generated for each client device separately. In some implementations, the contents of the strategy file may be encrypted.

The strategy identifies characteristics used to authenticate requests from a client device. Authenticating a request is based on the inclusion of the identifying characteristics within the request. For example, the strategy can direct the client device to populate a particular field in a header or cookie with a particular value.

A request for access to a processing system is received (706). The request can be an HTTP Request sent from a mobile application executing on the client device. The request may be for a resource stored on a processing system, such as an HTTP page or may be a request for an action or series of actions to be performed by the processing system, for example, checking a bank balance, paying a bill, etc.

The request is validated according to the current strategy (708). For example, the gatekeeper may identify content in the HTTP request which validates the request as coming from a legitimate client device. The content may be a predetermined HTTP header field which contains a predetermined value. In some implementations, the predetermined value may be encrypted. The predetermined value may be appended or prepended to a current time stamp. For example, if the predetermined value is "12345" the predetermined HTTP header field may include an encrypted and encoded value "12345,2013//11/8 2:38:23." The value may be encrypted using symmetrical key encryption and may be encoded to enable binary data to be transported over channels that expect ASCII, EBCDIC, of other textual formats.

In some implementations, the timestamp can be validated to ensure that the time indicated by the time stamp is within a threshold of the current time. In order to reduce the likelihood that otherwise valid requests are rejected because the time stored on the client device is not synchronized with the time stored on the gatekeeper, the gatekeeper may provide the client device with the current time, according to the gatekeeper, at the time the strategy is provided. The client device may calculate an offset between the current time according to the client device and the current time according to the gatekeeper. Timestamps generated by the client device may be adjusted according to the offset.

If the gatekeeper determines that the predetermined field includes the predetermined values then the request can be validated. As discussed above, the gatekeeper may have a number of different strategies stored in a strategy file. In some implementations, a request can be validated if it conforms to any non-expired strategy.

If the gatekeeper determines that the predetermined field does not comply with any valid strategy, for example, the reply does not include the characteristics identified in either an unexpired past strategy, the current strategy, or a future strategy, then the gatekeeper sends an error to the client device. In some implementations, the gatekeeper can send a message to the client device requesting that it update the encryption key stored on the client device. For example, the request from the client device may include a clear text version number that corresponds to the encryption key used to encrypt portions of the request. If the version number does not match the version number of the current encryption key, the gatekeeper may send a message to the client device requesting the client device update its encryption key.

In some implementations, the client device responds to the error by obtaining a new strategy from the gatekeeper.

The validated request is forwarded to the processing system (710). The processing system can handle the requests according to the contents of the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
receiving, from a client device, a request for access to a processing system;
determining whether a predetermined field in a header of the request includes a predetermined value by:
accessing a server strategy file comprising a first strategy, a second strategy, and a third strategy, each strategy defining a different request validation instruction, and wherein the second strategy predates the third strategy and the first strategy predates both the second strategy and the third strategy;
determining whether the predetermined field in the header of the request is identified by a name specified by any one of the first strategy, the second strategy, or the third strategy; and
decrypting, in response to determining that the predetermined field in the header is identified by the name, an encrypted value stored in the predetermined field and determining if the decrypted value includes the a predetermined value specified by any one of the first strategy, the second strategy, or the third strategy;

in response to determining that the predetermined field in the header of the request includes the predetermined value, forwarding the request to the processing system; and in response to determining that the predetermined field in the header of the request does not include the predetermined value, rejecting the request.

2. The method of claim 1, further comprising, prior to receiving the request, transmitting an encryption key to the client device to be used to encrypt the predetermined value.

3. The method of claim 1, wherein determining whether the header of the request includes the predetermined field includes identifying the predetermined field using a key of the strategy file.

4. The method of claim 1, wherein determining whether the predetermined field in the header of the request includes the predetermined value includes validating that a time identified by a time stamp included in the request is within a threshold value of the current time.

5. The method of claim 4, further comprising:
transmitting, to the client device and prior to receiving the request, time data indicating a time recorded by a server to be used by the client device to generate the time stamp.

6. The method of claim 1, wherein the predetermined value is encrypted using an encryption key stored securely on the client device.

7. The method of claim 1, further comprising, prior to receiving the request, transmitting a client strategy file to the client device, the client strategy file including one of the first strategy, the second strategy, or the third strategy.

8. The method of claim 7, wherein the client strategy file includes a command that instructs the client device to include the predetermined value in the header of the request and a key that specifies the name identifying the predetermined field.

9. A non-transitory computer storage medium encoded with computer program instructions that when executed by one or more computers cause the one or more computers to perform operations comprising:
receiving, from a client device, a request for access to a processing system;
determining whether a predetermined field in a header of the request includes a predetermined value by:
accessing a server strategy file comprising a first strategy, a second strategy, and a third strategy, each strategy defining a different request validation instruction, and wherein the second strategy predates the third strategy and the first strategy predates both the second strategy and the third strategy;
determining whether the predetermined field in the header of the request is identified by a name specified by any one of the first strategy, the second strategy, or the third strategy; and
decrypting, in response to determining that the predetermined field in the header is identified by the name, an encrypted value stored in the predetermined field and determining if the decrypted value includes the a predetermined value specified by any one of the first strategy, the second strategy, or the third strategy;
in response to determining that the predetermined field in the header of the request includes the predetermined value, forwarding the request to the processing system; and in response to determining that the predetermined field in the header of the request does not include the predetermined value, rejecting the request.

10. The medium of claim 9, the operations further comprising, prior to receiving the request, transmitting an encryption key to the client device to be used to encrypt the predetermined value.

11. The medium of claim 9, wherein determining whether the header of the request includes the predetermined field includes identifying the predetermined field using a key of the strategy file.

12. The medium of claim 9, wherein determining whether the predetermined field in the header of the request includes the predetermined value includes validating that a time identified by a time stamp included in the request is within a threshold value of the current time.

13. The medium of claim 9, wherein the predetermined value is encrypted using an encryption key stored securely on the client device.

14. The medium of claim 9, the operations further comprising, prior to receiving the request, transmitting a client strategy file to the client device, the client strategy file including one of the first strategy, the second strategy, or the third strategy.

15. The medium of claim 14, wherein the client strategy file includes a command that instructs the client device to include the predetermined value in the header of the request and a key that specifies the name identifying the predetermined field.

16. A system, comprising;
one or more processors; and non-transitory computer storage storing executable computer instructions which, when executed by the one or more processers, cause the one or more processors to perform operations comprising:
receiving, from a client device, a request for access to a processing system;
determining whether a predetermined field in a header of the request includes a predetermined value by:
accessing a server strategy file comprising a first strategy, a second strategy, and a third strategy, each strategy defining a different request validation instruction, and wherein the second strategy predates the third strategy and the first strategy predates both the second strategy and the third strategy;
determining whether the predetermined field in the header of the request is identified by a name specified by any one of the first strategy, the second strategy, or the third strategy; and
decrypting, in response to determining that the predetermined field in the header is identified by the name, an encrypted value stored in the predetermined field and determining if the decrypted value includes the a predetermined value specified by any one of the first strategy, the second strategy, or the third strategy;
in response to determining that the predetermined field in the header of the request includes the predetermined value, forwarding the request to the processing system; and
in response to determining that the predetermined field in the header of the request does not include the predetermined value, rejecting the request.

17. The system of claim 16, the operations further comprising, prior to receiving the request, transmitting an encryption key to the client device to be used to encrypt the predetermined value.

18. The system of claim 16, wherein determining whether the header of the request includes the predetermined field includes identifying the predetermined field using a key of the strategy file.

19. The system of claim 16, wherein determining whether the predetermined field in the header of the request includes the predetermined value includes validating that a time identified by a time stamp included in the request is within a threshold value of the current time.

20. The system of claim 16, the operations further comprising, prior to receiving the request, transmitting a client strategy file to the client device, the client strategy file including one of the first strategy, the second strategy, or the third strategy.

\* \* \* \* \*

UNITED STATES PATENT AND TRADEMARK OFFICE
CERTIFICATE OF CORRECTION

PATENT NO. : 11,095,630 B1
APPLICATION NO. : 15/882251
DATED : August 17, 2021
INVENTOR(S) : Christopher Thomas Wilkinson et al.

Page 1 of 1

It is certified that error appears in the above-identified patent and that said Letters Patent is hereby corrected as shown below:

In the Claims

Column 12, Line 64, Claim 1, delete "the a" and insert -- a --, therefor.

Column 13, Line 60, Claim 9, delete "the a" and insert -- a --, therefor.

Column 14, Line 54, Claim 16, delete "the a" and insert -- a --, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*